United States Patent [19]
Gatti et al.

[11] 3,957,633
[45] May 18, 1976

[54] SEWAGE TREATMENT METHOD AND APPARATUS

[75] Inventors: Giuliano Gatti, Milan, Italy; Hjalmar Fries, Spanga, Sweden

[73] Assignee: ITT Industries, Inc., New York, N.Y.

[22] Filed: Sept. 19, 1974

[21] Appl. No.: 507,404

[52] U.S. Cl. ............................. 210/104; 210/194; 210/220; 261/DIG. 75
[51] Int. Cl.² ......................................... C02C 1/08
[58] Field of Search ............... 137/569; 210/14, 15, 210/63, 103, 104, 123, 127, 170, 194, 195, 197, 199, 220; 261/DIG. 75; 417/40, 211.5

[56] References Cited
UNITED STATES PATENTS

| | | | |
|---|---|---|---|
| 2,355,564 | 8/1944 | Sebald | 210/123 X |
| 3,025,962 | 3/1962 | Williams | 210/104 X |
| 3,335,082 | 8/1967 | Ullrich | 210/199 X |
| 3,371,033 | 2/1968 | Simmons et al. | 210/197 X |
| 3,395,799 | 8/1968 | Kurtz | 210/123 X |
| 3,477,947 | 11/1969 | Kappe | 210/194 X |
| 3,525,685 | 8/1970 | Edwards | 210/170 X |
| 3,679,053 | 7/1972 | Koulovatos et al. | 210/104 X |

*Primary Examiner*—Charles N. Hart
*Assistant Examiner*—Robert H. Spitzer
*Attorney, Agent, or Firm*—Thomas L. Peterson

[57] ABSTRACT

In larger sewage water systems, there is a risk that the water may become rotten due to lack of oxygen. According to the invention, this problem is solved by letting the pump in a pump station of the system act as an aerator as well as a transporter of the water. To aerate the water, the outlet of the pump is connected to a jet nozzle with an air intake. The aerated water is conveyed back to the pump station tank. The pump outlet may also be connected to the outlet pipe of the tank for discharging sewage water from the tank.

3 Claims, 3 Drawing Figures

SEWAGE TREATMENT METHOD AND APPARATUS

BACKGROUND OF THE INVENTION

This invention relates generally to an apparatus and method for treating sewage water and, more particularly, to the aeration of sewage water.

The construction of relatively large conduit systems for collecting sewage water in communities is limited due to the fact that sewage water becomes rotten in the systems. The rottening of the sewage water results from the generation of hydrosulfuric acid and other poisonous gases in the water. This rottening takes place in the sewage water between three and six hours after it has left the household if sufficient oxygen is not added to it so that natural biological reactions can take place.

The poisonous gases that are generated by the rottening of the sewage water makes it difficult to purify the water effectively in the purification plants and causes odor problems at larger pump stations. The hydrosulfuric acid is also a health hazard.

Accordingly it is important that the rottening of sewage water in conduit systems be minimized by adding oxygen thereto. Studies made by R. D. Pomeroy and J. D. Parkhurst have shown that the oxygen consumption of sewage water can be as high as 20 mg/l per hour in conduits and pump stations because of the presence of a biological coating on the conduit walls and because of the growth of active sludge in the sewage water. By adding oxygen to the water during its transport through the conduit system it is possible to considerably reduce the organic load on the purification plants and make increased capacity possible.

The best place for adding oxygen to sewage water is when it has passed the smaller local systems and has begun to be collected in the first pump stations. Generally, by then the water has been in contact with the smaller pipes in the system during a period of about 30 minutes. The oxygen reaction rate developed by Pomeroy and Parkhurst indicates that at that time the risk of oxygen deficiency (septicity) occurs, which means that oxygen addition obtains a maximum effect at that point. Further forward in the conduit system, water passes further pump stations by which the time intervals between the stations are generally about 30 minutes.

The present invention concerns a method and apparatus for aeration of sewage water in pump stations.

SUMMARY OF THE INVENTION

According to the principal aspect of the present invention, there is provided a method and apparatus for aerating sewage water in a tank, such as a sewage water pump station. A pump is mounted in the tank with its inlet submersed in the sewage water. A conduit is connected to the outlet of the pump for providing flow communication between the pump and an outlet pipe of the tank. Sewage aeration means is provided in the conduit. This aeration means includes an air intake pipe which has an inlet outside of the tank allowing air to be drawn into the conduit. The conduit includes means for directing the flow of sewage water from the pump through the aeration means back into the tank. In addition, such means is shiftable to a position allowing flow of sewage water from the tank to the outlet pipe thereof for transport to an additional pump station. As a consequence, a single pump is utilized for both aerating the sewage water and transporting it from one station to the next. Thus, aeration is achieved in an economical manner.

DESCRIPTION OF THE PREFERRED EMBODIMENTS

Figure 1:
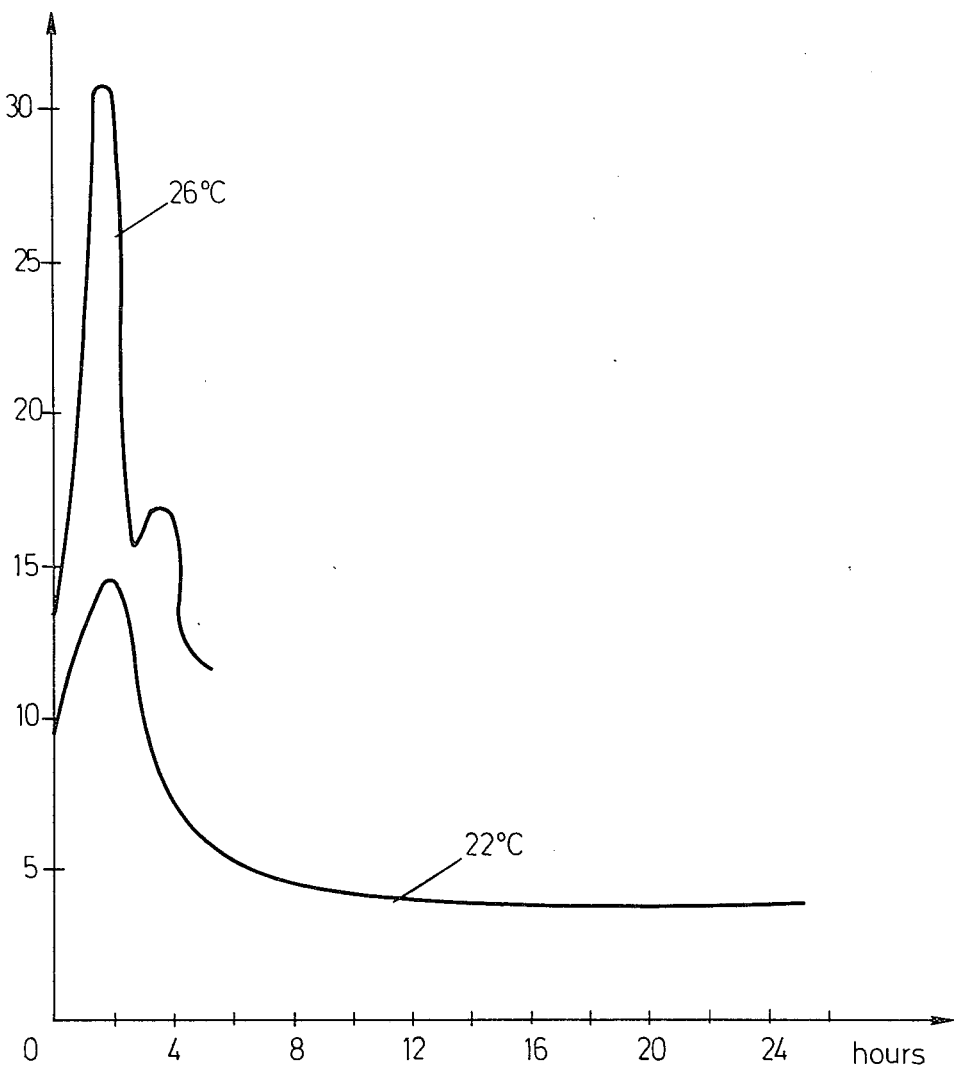
FIG. 1 is an oxygen consumption diagram according to Pomeroy and Parkhurst.

The two curves illustrated in FIG. 1 depict the oxygen reaction rate or oxygen consumption of sewage water versus time at two temperature levels, namely, 22°C. and 26°C., in accordance with the studies of Pomeroy and Parkhurst. It is noted from the curves that the period of maximum oxygen rate is about 30 minutes or so. The time intervals between pump stations in typical sewage water systems is approximately 30 minutes. Thus, according to the invention aeration of the water is caused to take effect at the pump stations. In general, this is accomplished by aerating the sewage water at the pump stations by the regular sewage pumps at those stations during times when these pumps are not utilized for transport of the water in the conduit systems. The aeration takes place by repumping of a smaller or bigger part of the water in such a way that air is added.

Figure 2:
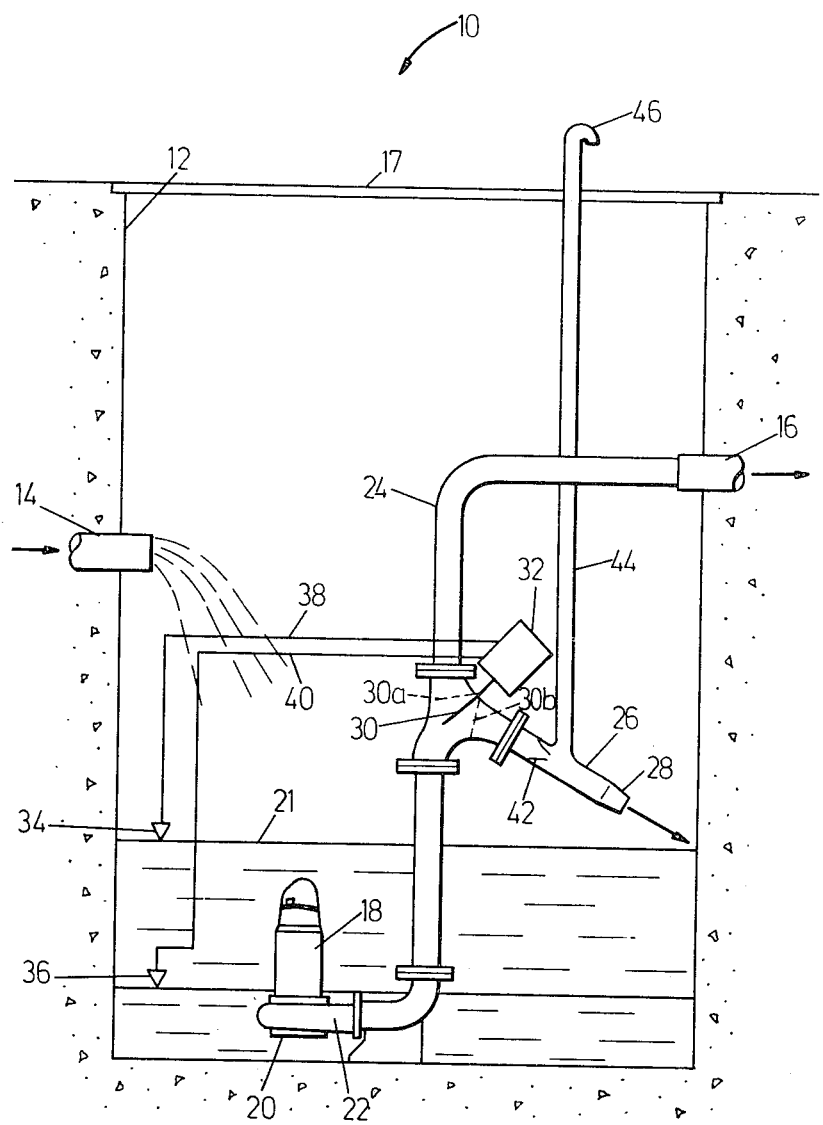
FIG. 2 is a schematic illustration of one embodiment of the sewage water aerating apparatus of the present invention.

Reference is now made to FIG. 2 of the drawing which illustrates one apparatus for performing the method of the present invention, such an apparatus being generally designated 10. The apparatus illustrated in FIG. 2 represents a pump station having a tank 12 with an inlet pipe 14 and an outlet pipe 16. The tank is closed by a cover 17. A pump 18 is mounted in the lower portion of the tank 12 so that its inlet 20 is submersed in sewage water 21 in the tank. The outlet 22 of the pump is connected by a conduit 24 to the tank outlet pipe 16. A second conduit 26 is joined to the conduit 24. This conduit extends downwardly at an angle and terminates in a discharge end 28. A valve flap 30 is mounted in the conduit 24 at the junction with the conduit 26. The position of the valve flap 30 is controlled by a control device 32. The control device 32 is responsive to output signals produced by two vertically spaced liquid level sensors 34 and 36. The sensors may be photometric or electrolytic. For example, each sensor could constitute a conductivity cell. The outputs of the sensors are fed by conductors 38 and 40 to the control device 32. This device incorporates a suitable control circuit, normally containing relays, which controls a solenoid that moves the valve flap 30 between the two positions shown in dotted lines in FIG. 1, indicated at 30a and 30b. The details of the sensors 34 and 36 and of the control device 32 would be apparent to those skilled in the art and details thereof are therefore not specified herein. The control device is designed so that when the level of water 21 reaches the sensor 34, the valve flap 30 is disposed in the position indicated at 30b. When the water level lowers to the level of the sensor 36, the control device shifts the valve flap 30 to the position indicated at 30a.

Aeration means is provided in the conduit 26. Such aeration means includes a jet nozzle 42 and an air intake tube 44 which is connected to the conduit 26 downstream of the nozzle 22. The air intake tube 44 extends through the cover 17 and has an inlet end 46 which is disposed outside of the tank 12.

Operation of the apparatus 10 is as follows. When sewage water reaches the level of the sensor 34, the valve flap 30 is shifted automatically to the position indicated at 30b. In this position of the valve flap, sewage water is pumped directly from the lower portion of the tank 12 through the conduit 24 to the outlet pipe 16. During this time, flow communication to the aeration nozzle 42 is prevented by the valve flap. When the sewage water reaches the level of the lower sensor 36, the valve flap is shifted automatically to the position indicated at 30a so that the sewage water will be conveyed by the pump 18 through the nozzle 42 rather than through the conduit 24 to the outlet 16. The water exiting from the nozzle 42 causes air to be sucked into the conduit 26 via the tube 44, and the mixture of water and air is sprayed through the discharge end 28 of the conduit 26 back into the tank 12. Thus, during this period of time the sewage water is being aerated. Such aeration will continue until the level of sewage water again reaches the sensor 34. It is of course possible that the controller 32 may be designed so that the valve flap 30 will take an intermediate position, as shown in full lines in FIG. 1, so that one part of the water is led to the outlet pipe 16 of the tank while the other part is led through the nozzle 42 to be aerated and returned to the tank.

Thus, it can be seen that by the present invention a single pump is utilized for both conveying sewage water from one pumping station to the next, and also for aerating the water at the station to reduce or eliminate rottening of the water.

Figure 3:
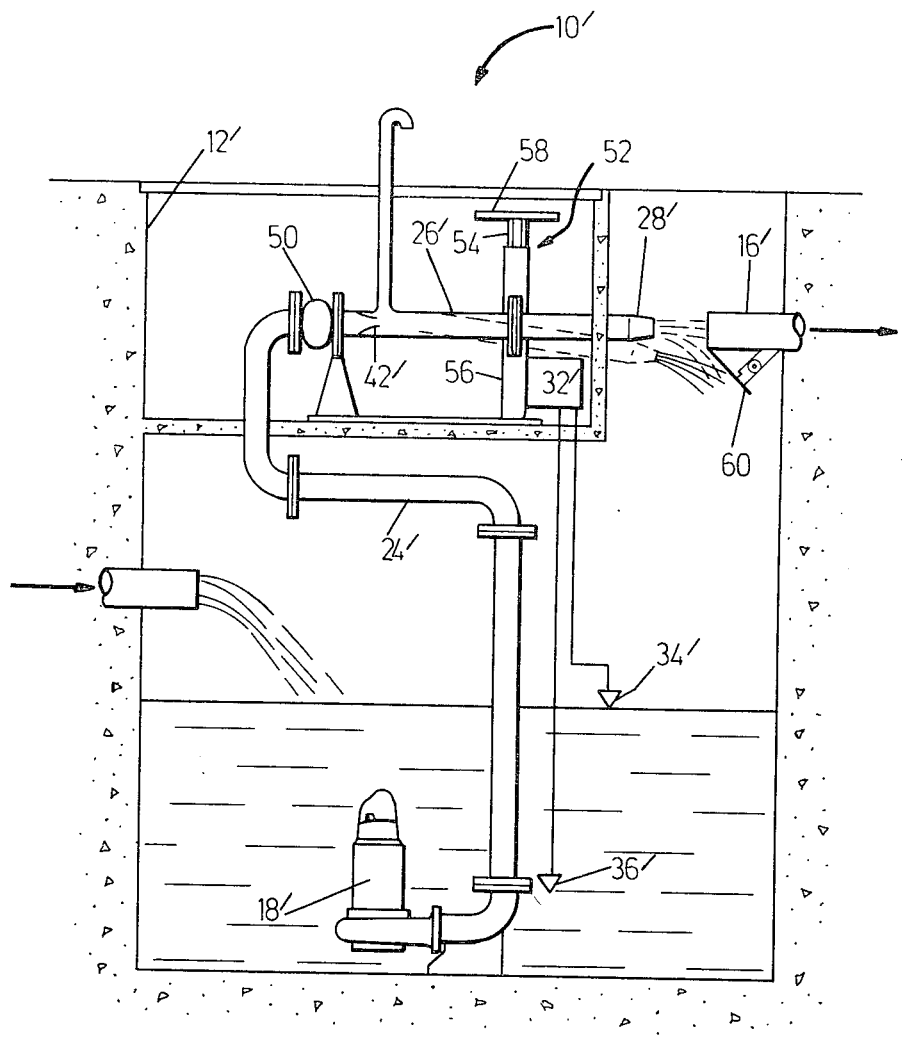
FIG. 3 is a schematic illustration of a second embodiment of the apparatus of the present invention.

Reference is now made to FIG. 3 of the drawing which illustrates another form of the apparatus of the present invention. In this embodiment, the basic structure is as previously described and like numbers primed are used to indicate like or corresponding parts. The apparatus 10' illustrated in FIG. 3 is similar to that illustrated in FIG. 2 except that the conduit 26' containing the jet nozzle 42' is connected to the end of conduit 24'. The valve flap 30 is eliminated in the apparatus 10'. The conduit 26' is connected to the conduit 24' by a resilient coupling 50. The conduit 26' is therefore pivotally mounted so that its discharge end 28' may be moved vertically. The discharge end 28' is spaced from the outlet pipe 16' of the tank and is normally positioned as shown in full lines in FIG. 3, in alignment with the outlet pipe. A device 52 is provided for vertically adjusting the position of the discharge end 28' of the conduit 26'. Such device may constitute a shaft 54 threaded into a cylinder 56 and rotatable by a wheel 58 whereby manual rotation of the wheel will shift the shaft 54 vertically. The conduit 26' would be connected by suitable means, not shown, to the shaft so that rotation of the shaft will alter the vertical position of the discharge outlet 28' of the conduit. As in the first embodiment, an electrical control device 32' may be provided for automatically controlling the position of the discharge outlet 28', which control device is responsive to the output signals produced by the liquid level indicators 34' and 36'. The control device 32' may include a motor, not shown, coupled to the shaft 54 by means of a suitable gear. Again, the details of the control device 32' and the adjustment means for the discharge outlet 28' of the conduit 26' would be apparent to those skilled in the art. Obviously, other arrangements could be utilized. The manually operable adjustment wheel 58 or the automatically responsive liquid level control device 32' function to shift the discharge outlet 28' of the conduit 26' to the position shown in dotted lines in FIG. 3 where sewage water exiting from the outlet will engage a deflector 60 connected to the bottom of the outlet pipe 16' so that the water will be directed to the bottom of the tank 12'. The controller 32' is designed so that when the water is at the level of the sensor 34', the discharge nozzle 28' is in alignment with the outlet pipe 16' and when the level of the water reaches the lower sensor 36' the motor in the controller 32' will shift the shaft 54 downwardly, and hence move the discharge outlet 28' of conduit 26' to a position directed at the deflector 60 below the outlet pipe 16' as shown in dotted lines in FIG. 3. The controller 32' can also be designed to position the discharge outlet 28' in an intermediate position wherein some of the water will flow out through the outlet pipe 16' and some will be directed downwardly by the deflector 60 into the tank 12'.

In operation of the apparatus 10', when the discharge outlet 28' is in the position shown in full lines in FIG. 3, the water conveyed by the pump 18' will pass via the conduit 24' through the jet nozzle 42' and outwardly from the discharge outlet 28' through the outlet pipe 16' of the tank. Thus, all water discharged through the outlet pipe 16' in this apparatus is aerated. When the discharge outlet 28' is in its lowered position, the aerated water is directed back into the tank 12'.

The position of the discharge outlet 28' could obviously be controlled by other means, for example, by a simple mechanical float control device, in which the float would be coupled directly to the conduit 26'. Such an arrangement would have the advantage of simplicity over an electrically controlled system. The embodiment illustrated in FIG. 2, however, has the advantage that full pressure of the pump can be used for pumping water out through the outlet pipe 16 and not only dynamic pressure from the jet nozzle as in the embodiment illustrated in FIG. 3. In both embodiments the control device can be made so that the pumping and the aeration, respectively, are continuous and variable, or work individually, so that water is first aerated and then pumped out of the tank. The invention has the apparent advantage that it utilizes only a single pump for performing both the aeration and pumping functions.

What is claimed is:

1. An apparatus for treating sewage water comprising:
   a tank containing sewage water having an inlet pipe and an outlet pipe;
   a pump in said tank having an inlet and an outlet, said inlet being submersed in said sewage water;
   a conduit connected at one end to said pump outlet and terminating at its other end in a movable discharge outlet adjacent to but spaced from said tank outlet pipe;
   sewage aeration means in said conduit, said aeration means including an air intake pipe connected to said conduit and having an inlet outside of said tank;
   means for moving said discharge outlet between first and second positions, in said first position said discharge outlet being aligned with said outlet pipe and in said second position said discharge outlet being directed away from said outlet pipe; and
means for controlling the position of said discharge outlet.

2. An apparatus as set forth in claim 1 wherein: said control means is automatically responsive to the level of water in said tank.

3. An apparatus as set forth in claim 1 wherein: said aeration means further includes a jet nozzle in said conduit upstream of said air intake pipe.

* * * * *